United States Patent [19]

Collmann

[11] Patent Number: 4,508,498

[45] Date of Patent: Apr. 2, 1985

[54] SPACER DEVICE FOR A TIRE PROCESSING MACHINE

[76] Inventor: Wilhelm Collmann, Auf der Höhe 25, 2400 Lübeck, Fed. Rep. of Germany

[21] Appl. No.: 595,911

[22] Filed: Apr. 2, 1984

[30] Foreign Application Priority Data

Apr. 8, 1983 [DE] Fed. Rep. of Germany ....... 3312618

[51] Int. Cl.³ ............................................. B29H 5/02
[52] U.S. Cl. ........................................ 425/58; 425/36
[58] Field of Search .............................. 425/36, 58, 47

[56] References Cited

U.S. PATENT DOCUMENTS

| | | | |
|---|---|---|---|
| 2,291,506 | 7/1942 | Shook et al. | 425/47 X |
| 3,184,794 | 5/1965 | Sherkin | 425/36 X |
| 3,195,179 | 7/1965 | Laube | 425/36 X |
| 3,342,663 | 9/1967 | Pouilloux | 425/36 |
| 3,554,262 | 1/1971 | Swanson | 425/36 X |
| 3,590,433 | 7/1971 | Rawls | 425/36 X |
| 3,790,656 | 2/1974 | Getz | 425/58 X |
| 4,124,337 | 11/1978 | Martin | 425/36 X |

*Primary Examiner*—J. Howard Flint, Jr.
*Attorney, Agent, or Firm*—Balogh, Osann, Kramer, Dvorak, Genova & Traub

[57] ABSTRACT

The device comprises a spacing member axially screwable within a screw-threaded member, acting as a stop and establishing the operating position in question. For structural simplification and reduction of the production cost of the device, the screw-threaded member and the spacing element are substantially formed as sleeves which comprise a longitudinally extending slot. The slots may be placed in coincidence and have a width at least such that the device may be placed on an axially displaceable connecting rod of the tire processing machine, said rod carrying a tire holding means, the connecting rod being substantially surrounded.

5 Claims, 4 Drawing Figures

SPACER DEVICE FOR A TIRE PROCESSING MACHINE

The invention relates to a device for setting the distance between two mutually opposed tire holding means of a tire processing machine, in which at least one of the tire holding means may be displaced axially into the operating position by means of a connecting rod or of an axial element, comprising a distance element axially screwed into a threaded member, acting as a stop and establishing the operating position in question.

BACKGROUND OF THE INVENTION

In a tire processing machine of the kind in which two tire holding means are mutually opposed, for setting the distance between these tire holding means it is known to use a device comprising a framework or a supporting structure and two distance elements attached thereto and outwardly swingable. The spacing elements as such are each formed by an internally screw-threaded member fixedly mounted on the framework, and by a bolt-like spacing element screwed into this screw-threaded member, the bolt being rotated for setting the applicable axial distance between the tire holding means and thus of the corresponding operating position. The rear extremity of a connecting rod rearwardly traversing the cylinder of a pneumatic piston and cylinder unit secured on the machine frame is placed in contact with the impingement surface of an associated spacing element, whereas the forward end of the connecting rod carries tire holding means.

Although this known spacing mechanism provides for setting different distances by means of a single unit formed by the two distance elements, it is expensive in respect of material and production costs because of the comparatively large framework, and furthermore requires a substantial installation space. Another disadvantage is that the cylinder requires a sealed passage at its rear end for passage of the connecting rod and this involves an additional production cost.

Spacing mechanisms comprising a step-like spacing unit are also known, which are internally secured to the machine frame and furthermore comprise a hydraulic cylinder unit operating transversely with respect to a connecting rod carrying the displaceable tire holding means. The spacing unit is displaced by means of the cylinder unit into the vertical position between the tire holding means and the machine frame which determines the required operating position of the tire holding means, whereupon the tire holding means is moved back towards the spacing unit to assume its operating position. In view of its displacing cylinder unit and of its appropriate attachment to the machine frame, this device is also expensive as regards material and production costs.

It is also known that a loose spacing unit may be placed on the displaceable connecting rod and this unit may then be clamped between the tire holding means and the machine frame to set the required operating position. Such spacing units comprise fixed-length spacing elements formed by a pair of bolts held together by means of a handle. Consequently a separate spacing unit is needed for each distance or operating position, so that a set of several spacing units is required for a tire processing machine.

It is an object to devise a spacing device of the kind specified, which is substantially simplified in its structure and may be produced at low cost.

SUMMARY OF THE INVENTION

The resolution of the problem is based on a screw-threaded device as defined in the foregoing, which is characterised in that the screw-threaded member and the spacing element are substantially constructed as sleeves which comprise a longitudinally extending slot, and that the slots which may be placed in coincidence correspond in their width at at least the diameter of the displaceable connecting rod or of the displaceable axial element.

Apart from the advantage that all required distances may be set between the tire holding means in the case of a tire processing machine by means of a single connecting rod carrying the two tire holding means and a single spacing unit, a spacing device of this kind has the additional advantage that it has a very uncomplicated structure, so that the said framework or the displacing cylinder unit is superfluous. This leads to considerably reduced production costs for the spacing device. It is advantageous moreover that the new device situated on the connecting rod in question between the tire holding means and the machine frame, practically surrounds the connecting rod so that a comparatively large contact surface on the spacing device which extends annularly around the connecting rod, is available in practice for the tire holding means. The rearward axial forces of the tire holding means are intercepted more satisfactorily when the tire is held fast, which exposes the rolling friction bearings of the tire holding means, rotatably journalled on the connecting rod, to lesser stresses than hitherto. The utilisation of the new spacing device is simplified, since the two sleeves need merely be turned with respect to each other when the device bears on the connecting rod, to establish the spacing required in each case.

BRIEF DESCRIPTION OF THE DRAWINGS

The invention will now be described, by way of example, with reference to the accompanying parly diagrammatic drawings, in which.

DETAILED DESCRIPTION OF THE DRAWINGS

Figure 1:
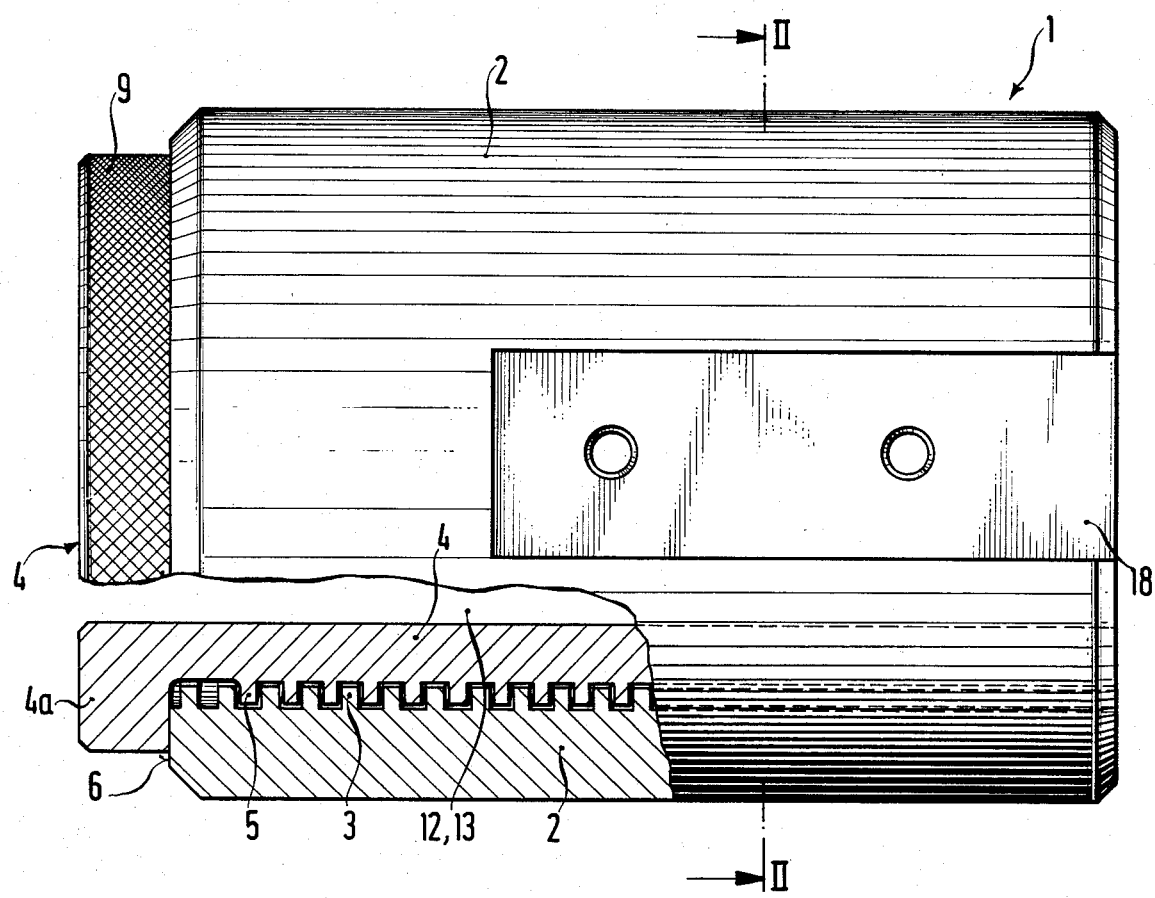
FIG. 1 is a partially cross-sectioned sideview of one embodiment of the invention.
Figure 2:
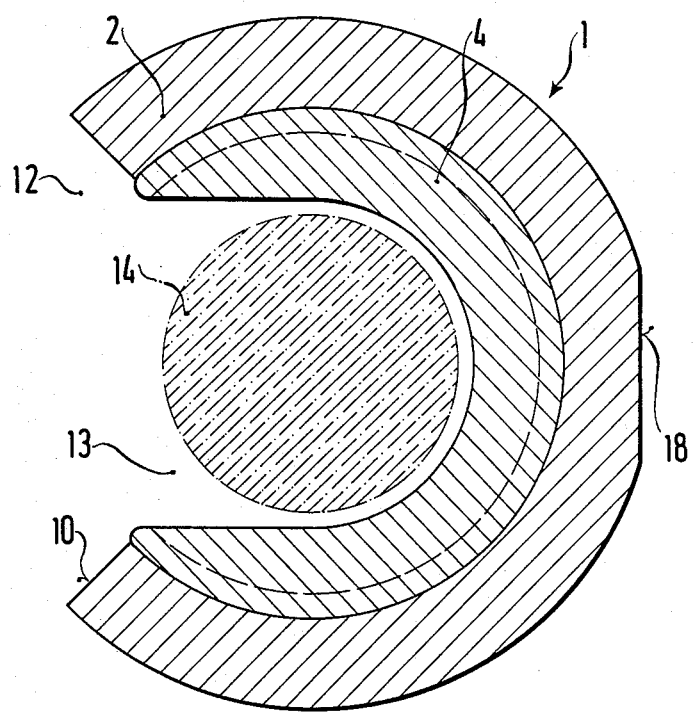
FIG. 2 is a cross-section along the line II—II in FIG. 1, viewed in the direction of the arrow.
Figure 3:
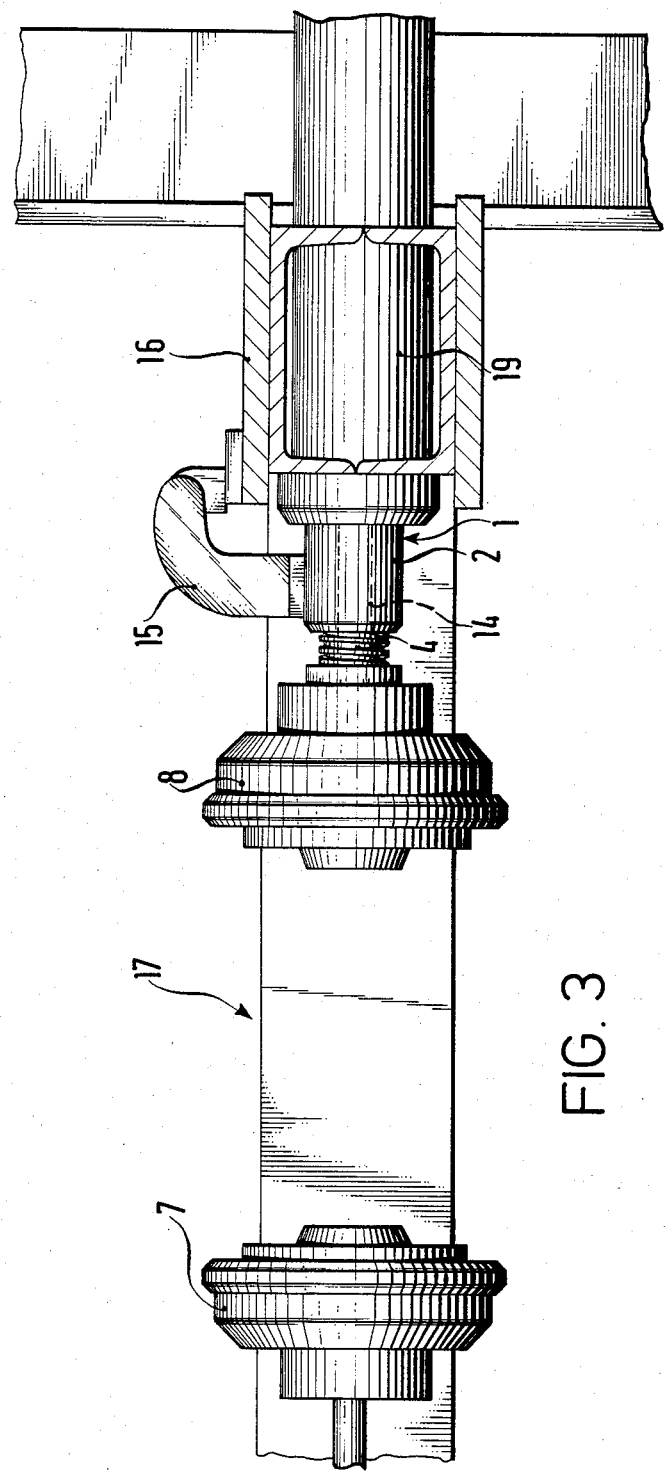
FIG. 3 is a plan view of the embodiment of FIGS. 1 and 2, arranged in the operating position on a partially illustrated tire processing machine.

The embodiment depicted in FIGS. 1 and 2 has a spacing unit 1 comprising an outer sleeve 2 having an internal screw-thread 3 extending from end-to-end of the sleeve 2, and an inner sleeve 4 having an external screw-thread 5. The two screw-threads 3 and 5 consists of square threads. The inner sleeve 4 has an outwardly extending flange 4a at one extremity, which bears against the opposed end surface 6 of the outer sleeve 2 when the inner sleeve is completely screwed into the outer sleeve. This position of the inner sleeve 4 may correspond to the smallest spacing length of the spacing unit, and has the result that the maximum spacing is thereby established between two tire holding tools 7 and 8 (FIG. 3). To simplify handling of the sleeve 4, the flange 4a is knurled by milling or the like on its outer periphery 9.

Figure 4:
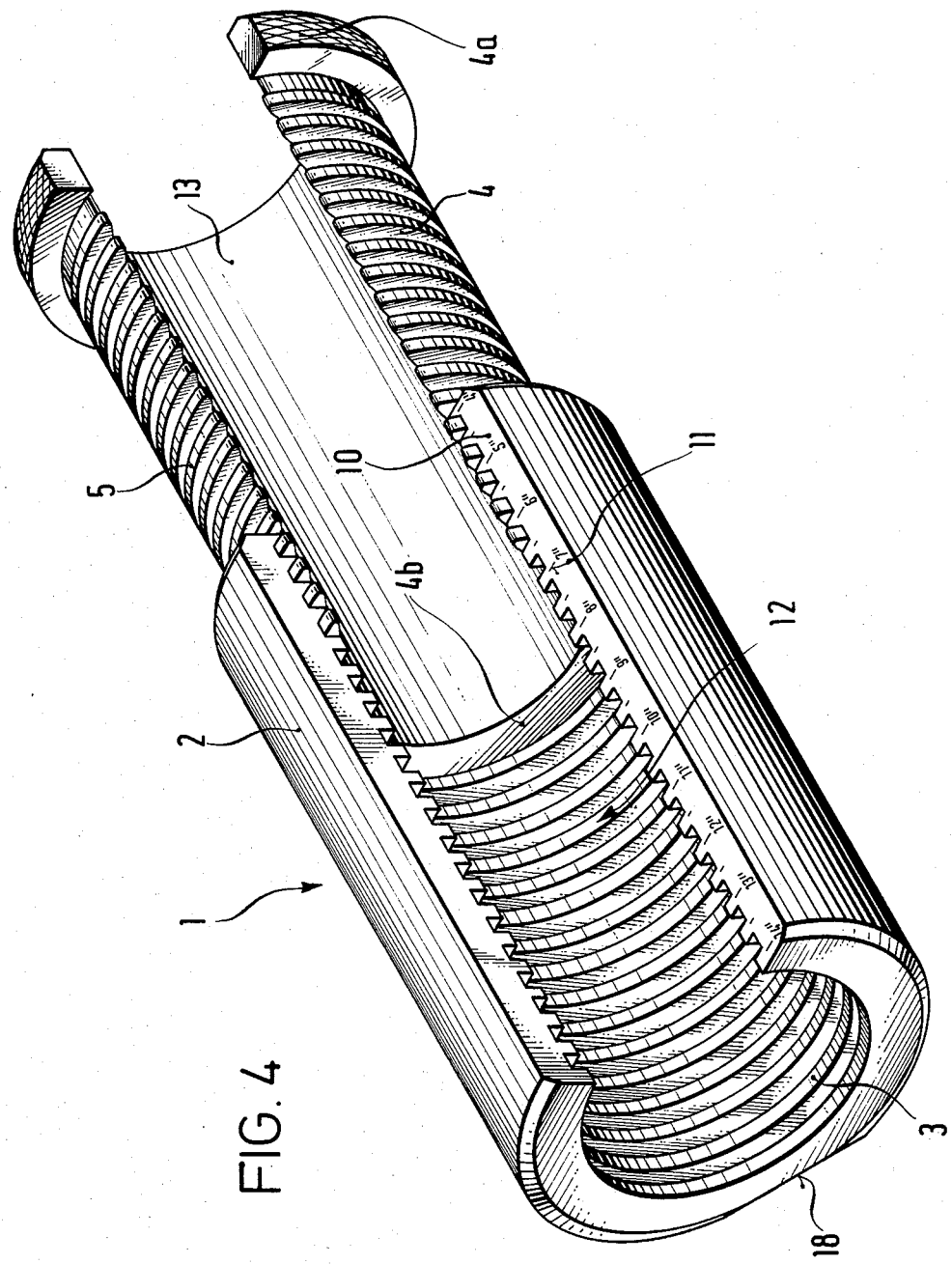
FIG. 4 is a view in perspective of the embodiment of FIGS. 1 and 2.

As apparent from FIGS. 2 and 4, the two sleeves 2 and 4 are equipped throughout their axial length with wide slots 12 and 13, respectively, the slots being sufficiently wide to allow the spacing unit 1 to be pushed laterally over an axially displaceable connecting rod 14 and placed thereon. The one delimiting surface 10 of the slot 12 of the outer sleeve 2 is organised as a scale carrier and carries a scale 11, FIG. 4, graduated in inches, since the tire width is normally given in inches. The terminal surface 4b of the inner sleeve 4 which is substantially surrounded by the outer sleeve 2, acts for example as a reference mark or calibrating mark for the scale. According to FIG. 4, the spacing unit 1 is set at six inches by reciprocal rotation of the two sleeves.

The unit 1 may be constructed as a loose unit. It may however also be articulated by means of a pivoting lever 15 on the frame 16 of the partially illustrated tire processing machine 17, as shown in FIG. 3. The pivoting lever 15 may for example be bolted to the spacing unit 1, to which end the outer sleeve 2 has a flat area 18 engaged by the pivoting lever 15.

In the tire processing machine partially shown in FIG. 3, the tire holding means 7 is installed in axially stationary manner, whereas the tire holding means 8 is axially displaceable by means of the connecting rod 14 which is reciprocably mounted in a hydraulic cylinder 19 secured on the frame 16 in a known manner. It is quite possible however for the tire holding means 7 to be arranged to be axially displaceable in similar manner. In this case two spacing units 1 are then required to place the two tire holding means 7 and 8 at the mutual operating distance which is required in each instance.

Before the spacing unit 1 is placed on the connecting rod 14, the two sleeves 2 and 4 should be turned in such manner that the two slots 12 and 13 are placed in coincidence. The operating length required in each case for the spacing unit 1 is then set, after mounting the unit 1 on the rod 14, by turning the sleeves. For this operation, the tire holding means 8 is placed in a somewhat advanced position. After adjustment of the spacing unit 1, the tire holding means 8 is moved back until it is in contact with the unit 1 which bears on the frame 16 of the machine 17. In this condition, the whole unit is gripped between the tire holding means 8 and the frame 16, and the two tire holding means 7 and 8 then have the required axial operating distance from each other.

The square screw-threads 3 and 5 referred to in the foregoing are advantageous, inasmuch as they do not engender any radial forces which could cause excessive radial strain on the sleeves 2 and 4 because of the two slots 12 and 13. Trapezoidal screw-threads may, for example, also be utilised under appropriate dimensioning of the sleeves.

FIG. 3 has been drawn in simplified form, inasmuch as the tire holding means 7 and 8 merely show the heads on which the annular plates carrying the tire in question are installed in a known manner.

As an alternative embodiment, an axially displaceable axial element mounted in the frame 16 and on which the spacing unit 1 is placed, may be provided instead of the connecting rod 14. The axial element may be axially entrained by means of a power cylinder parallel to the same. Furthermore, the spacing unit 1 may also be placed onto the connecting rod 14 or the said axial element, by means of a power cylinder secured on the frame 16, instead of utilising the pivoting arm 15.

What I claim is:

1. A spacer device for setting the distance between two mutually opposed tire holding means of a tire processing machine, in which at least one of the tire holding means is displaceably mounted for axial displacement into the operating position by means of a connecting rod or of an axial member, the device comprising a spacing element axially screwed into a threaded member, and adapted to act as a stop for establishing the operating position in question, the threaded member and the spacing element being constructed substantially as sleeves, each having a longitudinally extending open ended slot, the slots having widths corresponding at least to the diameter of the connecting rod or axial member, whereby the sleeves may be relatively rotated to place the slots in coincidence to allow lateral mounting of the device on the rod or axial member through the slots.

2. A device according to claim 1, in which the screw connection of the two sleeves comprises square screw-threads.

3. A device according to claim 1, in which the spacer unit formed by the two sleeves is mounted on the tire processing machine in pivotably or linearly displaceable manner for movement onto and away from the axial member or rod.

4. A device as claimed in claim 1, in which the spacer unit formed by the two sleeves is mounted on the tire processing machine on linear displacement means whereby the unit may be moved onto and away from the axial member or rod.

5. A device according to claim 1, in which one delimiting surface of the slot of the outer sleeve is arranged as a scale carrier.

* * * * *